United States Patent [19]

Munich et al.

[11] Patent Number: 4,670,757
[45] Date of Patent: Jun. 2, 1987

[54] BISTATIC OBJECT LOCATION METHOD

[75] Inventors: August E. Munich, West Islip; Edward J. Schecker, North Babylon, both of N.Y.

[73] Assignee: Eaton Corporation, Cleveland, Ohio

[21] Appl. No.: 727,953

[22] Filed: Apr. 26, 1985

[51] Int. Cl.$^4$ ............................................... G01S 3/02
[52] U.S. Cl. ................................. 342/450; 342/451; 342/453; 364/451
[58] Field of Search ............... 342/11 R, 15, 450, 451, 342/453; 364/451, 458

[56] References Cited

U.S. PATENT DOCUMENTS

| | | | |
|---|---|---|---|
| 2,468,269 | 4/1949 | Nelson | 343/115 |
| 2,840,813 | 6/1958 | Clark | 343/120 |
| 3,025,520 | 3/1962 | Werner et al. | 343/105 |
| 3,581,073 | 5/1971 | Visher | 364/451 |
| 3,778,602 | 12/1973 | Schmitt | 364/451 |
| 4,179,697 | 12/1979 | Golinsky | 343/112 D |
| 4,413,322 | 11/1983 | Foster et al. | 364/451 |

Primary Examiner—Theodore M. Blum
Attorney, Agent, or Firm—D. A. Rowe; V. J. Ranucci

[57] ABSTRACT

A method for passively locating in range and azimuth both active, such as radar, and passive objects. The present invention uses existing direction finding equipment located on a platform, such as an aircraft or ship. At the platform, the invention includes measuring the scan period of the radar, the time of intercept of the main beam of the radar, the angle of arrival of the radar main beam, the time of arrival of a bistatic signal echo from a passive object which has been illuminated by the radar, and the angle of arrival of the echo; calculating the difference between the angle of arrival of the echo and the angle of arrival of the radar main beam to obtain an angle $\theta$; determining an angle $\phi$ subtended by a line drawn from the platform to the passive object; determining the difference T between the time when the radar main beam passes the platform and the time of arrival of the echo; calculating the difference t between the time the bistatic signal travels the distance from the radar to the passive object to the platform and the time radar energy travels from the radar to the platform; and using $\theta$, $\phi$, and t to determine each range from the platform to the radar and from the platform to the passive object.

4 Claims, 4 Drawing Figures

BISTATIC OBJECT LOCATION METHOD

BACKGROUND OF THE INVENTION

1. Field of the Invention

This invention relates to an object locating method and more particularly pertains to a passive method for detecting the range and azimuth of active and passive targets.

Typically, in an electronic warfare scenario, the enemy may employ a high-power search radar having a regular circular scan. When the radar detects a penetrator, such as an aircraft, the radar vectors another aircraft to intercept the penetrator. Thus, it is very desirable for the penetrator to locate in range and azimuth both the enemy radar (an active target) and the enemy interceptor (a passive target) passively, that is, without using the penetrator's radar.

2. Description of the Related Art

One basic problem in electronic warfare has been to locate in range and azimuth an enemy emitter, such as radar, without actively radiating an RF signal which can betray the radiating position. In the past the azimuth part of this problem has been solved with various types of direction finding (DF) equipments which are typically included in military platforms such as aircraft and ships. Passive ranging however is a much more difficult problem and has just now started to yield to effective solution.

A first solution is to use the DF equipment to achieve successive DF angles. For example, an aircraft 10, which carries DF equipment, flies a baseline distance 12 as shown in FIG. 1. By triangulation the range to an emitter 14 may be found as energy from the emitter is received by the aircraft 10. This technique works best broadside to the aircraft 10 where a rather large triangle baseline 12 may be effected. A problem with this approach is the relatively long time required to fly the baseline. Another problem is that this approach works very poorly directly off the nose of the aircraft because a much smaller baseline and, therefore, a smaller triangle is effected. This is unfortunate since the most interesting signals are in the nose aspect of the aircraft, i.e., from emitters that the aircraft is approaching, and the aircraft will very shortly overfly these emitters.

A second technique is to estimate the range by means of power received. This technique relies upon the fact that in free space power received is inversely proportional to range squared. The problem with this technique is that multipath effects, over the horizon attenuation effects, and power level quantizing effects lead to very large range estimation errors.

A third approach, depicted in FIG. 2, is known as PROSE (Passive Ranging On Scanning Emitters), also known as LRPLS (Long Range Passive Location System). This technique relies upon the exploitation of the scan rate of a circular scan search radar 16. In the implementation of this technique two antennas 18 and 20 are placed on an aircraft as far apart as possible, such as on wing tips. The two antennas 18 and 20 intercept the radar beam at slightly different times as the beam swings by the aircraft position. The intercepted blip envelope from the second antenna overlaps the blip envelope from the first antenna but is slightly shifted in position one from the other. By careful processing in a computer the centroid of one blip may be separated from the other and the time differential (TD) when the center of the radar beam passed each antenna may be determined. This calculation yields the angle subtended, $\Omega$, at the radar 16 by the two wing tip antennas 18 and 20 as follows $$\frac{TD}{\text{Time of one scan}} \times 360° = \text{ANGLE}$$

A DF system on the aircraft records independently the angle of incoming radar signals. The triangle baseline 22 is known (wing tip to wing tip) and thus the triangle 22, 24, 26 may be solved.

The problem with this technique is that the triangle 22, 24, 26 is a very long one with a very short baseline 22. The accuracy depends heavily upon how accurately the time between the two blip centroids can be determined. In order to get a reasonable 5 percent to 10 percent range accuracy the computer must average as many as 10 blips plus all side and back lobes. This process usually takes as long as 100 seconds to effect one range measurement.

A most significant problem with all three of the above techniques is that these techniques detect the location of only the emitter, an active target, but not the location of a passive target.

A fourth technique named APLS (Airborne Passive Location System) is related to LRPLS and PROSE in that APLS is a bistatic technique which first uses PROSE to determine one leg of a larger triangle. Once this is determined then bistatic reflections from passive targets may be intercepted and their locations derived by triangulation. APLS suffers from the problem of first requiring the range of the radar to aircraft to be determined by PROSE before APLS can detect and range on other passive targets.

All the above techniques suffer from relatively long integration periods necessary to achieve an output range. PROSE type solutions suffer from the need for special wing tip antennas which are typically large low frequency (3 GHZ) types. For example, on some aircraft it is inconvenient to locate such antennas on the wing tips because of an air drag problem, because of the problem of routing cables or waveguide through the wing, and past a pivot point in pivoting wing aircraft, and because of the priority that other ECM functions have upon such wing tip antenna locations.

It is because of these deficiencies that the Bistatic Object Location Method was developed. The present invention utilizes a DF system, including antennas, existing on an aircraft or any other platform, such as a ship, satellite, land vehicle, or fixed station. The invention provides a high degree of accuracy from a very wide triangle, effectively increasing the baseline of prior art techniques measured in feet to a baseline measured in miles. No wing tip antennas are required because the invention uses only fuselage-mounted DF antennas. Only 1 blip width (about 30 milliseconds) is required, following synchronization to the radar scan period, by this method to produce range and direction of both a radar and passive target reflectors. The invention can operate on a multitude of passive target reflectors within the preview of a radar and the platform using the method during every radar scan period. The present invention detects the location of not only a radar but passive target reflectors, such as interceptor aircraft, as well. Thus, the invention provides fast, accurate range and azimuth location information on both an active (radar) target and a multitude of passive targets.

The present invention can be used to locate additional active targets sequentially by appropriately adjusting the operating frequency of the DF system.

SUMMARY OF THE INVENTION

It is the general purpose and object of the present invention to determine in a passive manner the position in range and azimuth of a number of targets at least one of which targets is active.

It is another object of the present invention to provide a passive locating system for detecting in range and azimuth both active and passive targets, the active and passive targets being stationary, moving or a combination of both stationary and moving.

It is a further object of this invention to provide a novel and passive location system which requires a minimum of complexity and no additional hardware to an existing direction finding system.

It is a further object of this invention to provide a passive locating system which requires no constraints on the position of the observing platform.

It is still another object of the present invention to overcome limitations of direction finding equipment.

These and other objects of the present invention are accomplished at a platform by measuring the scan period of an active target, such as a radar, the time of intercept of the main beam of the radar, the angle of arrival of the radar main beam, the time of arrival of a bistatic signal echo from a passive object which has been illuminated by the radar, and the angle of arrival of the echo; calculating the difference between the angle of arrival of the echo and the angle of arrival of the radar main beam to obtain an angle $\theta$; determining an angle $\phi$ subtended by a line drawn from the platform to the passive object; determining the difference T between the time when the radar main beam passes the platform and the time of arrival of the echo; calculating the difference t between the time the bistatic signal travels the distance from the radar to the passive object to the platform and the time radar energy travels from the radar to the platform; and using the values for $\theta$, $\phi$, and t to determine the ranges from the platform to the radar and from the platform to the passive object.

Other objects and advantages of the present invention will become apparent from the following detailed description of the invention when considered in conjunction with the accompanying drawings wherein:

DETAILED DESCRIPTION OF THE INVENTION

Figure 1:
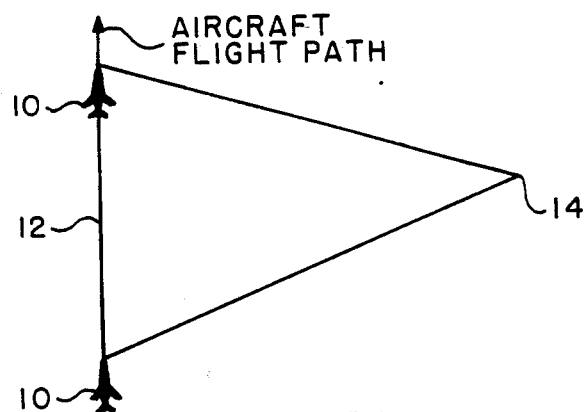
FIG. 1 shows an aircraft receiving energy signals from an emitter to illustrate the prior art.
Figure 2:
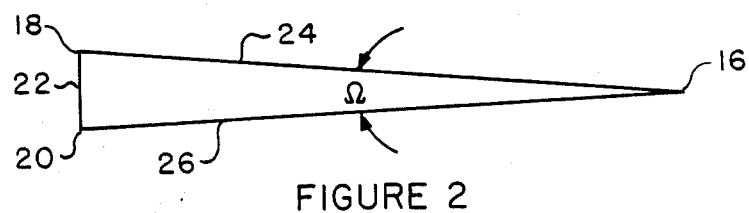
FIG. 2 is a diagram illustrating the results of a prior art technique for locating in range and azimuth an active target.
Figure 3:
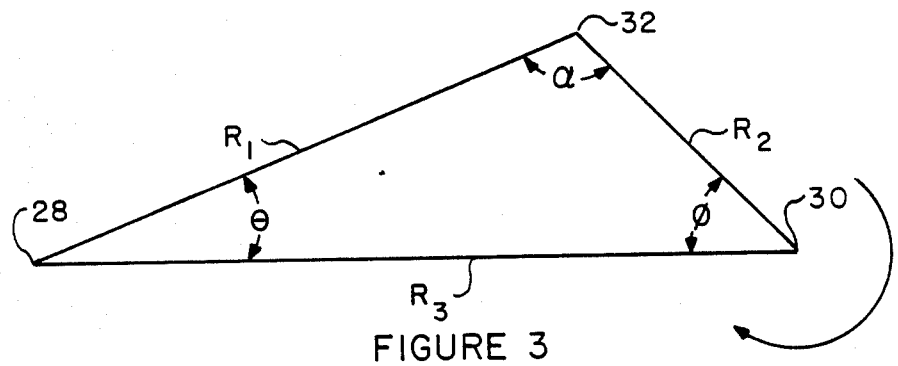
FIG. 3 is a diagram showing the results of the present invention for locating in range and azimuth an active target and a passive target.

An aircraft 28, or any platform such as a ship, satellite, land vehicle, or fixed station, having direction finding equipment (DFE), typically, but not necessarily, of the type associated with an electronic support measures(ESM) system, which DFE can receive electromagnetic energy, is located at a distance $R_3$ from an active object, such as a scanning search radar 30 as shown in FIG. 3. Distance $R_1$ is the range from the aircraft 28 to a passive reflecting object 32, such as an enemy fighter aircraft $R_2$ is the range from the passive target 32 to the radar 30. Angle $\theta$ is the angle between $R_3$ and $R_1$. Angle $\phi$ is the angle between $R_3$ and $R_2$.

The radar 30 scans past the aircraft 28. As the radar 30 continues to scan in a circular (typically clockwise direction in a full 360° circle for purposes of our illustration) manner, the radar eventually points its main beam at the passive target 32 thus illuminating the passive target via $R_2$. The scan period (in seconds) of the radar 30, that is, the time it takes the radar to progress through one scan, is first measured by the DFE as the main beam of the radar illuminates the aircraft 28 via $R_3$, and is measured again on the next scan. As an alternative and as a first approximation of the scan period, a look up table may be used to determine the scan period when the radar 30 is first identified, as to type, by the main ESM system of the aircraft 28.

Figure 4:
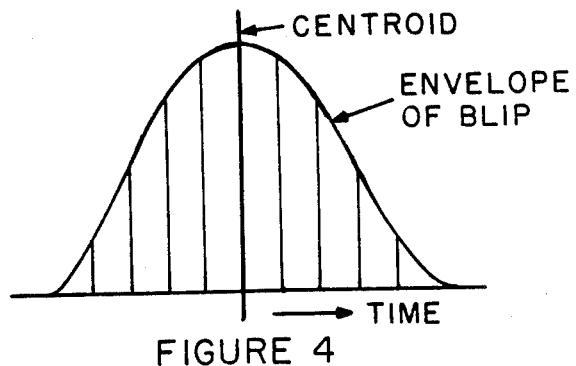
FIG. 4 shows the centroid of all the pulses received during a main beam blip to determine the time of intercept.

The time of intercept of the radar 30 main beam is measured by the DFE as the beam illuminates the aircraft 28. The time of intercept is determined as the centroid of all the pulses received during a main beam blip as shown on FIG. 4. The angle of arrival of the main beam is measured by the DFE with respect to the centerline of the aircraft 28.

As the radar 30 illuminates the passive target 32 with its main beam, the DFE on the aircraft 28 receives a bistatic echo blip from the passive target via $R_1$. This bistatic echo received via $R_1$ is weaker in amplitude than the first radar main beam signal received by the DFE via the direct path $R_3$ but is still easily detected by the DFE. The time of reception of this bistatic echo blip is measured by the DFE and the centroid of the blip is determined. Also, the angle of arrival of the bistatic echo blip is measured with respect to the centerline of the aircraft 28.

The angle $\theta$ in FIG. 3 is determined by calculating the difference between the angle of arrival at the aircraft 28 of the radar main beam as the radar main beam illuminates the aircraft and the angle of arrival at the aircraft 28 of the bistatic echo.

The angle $\phi$ in FIG. 3 is determined by the radar scanning 360° in one radar scan interval, and the scan period of the radar as previously measured. The time difference, T, between the time when the radar main beam passes the aircraft 28 and the time of arrival at the aircraft of the bistatic echo from the passive target 32 is determined by the DFE. This time difference, T, is used to measure the angle $\phi$ as follows:

$$\phi = \frac{T}{\text{radar scan period}} \times 360°$$
For a circular scan radar $$\phi = \frac{T}{\text{radar scan period}} \times \text{sector scan width}$$
For a sector scan radar The accuracy of measurement of this angle $\phi$ is quite high because the radar scan period is normally in the order of approximately 10 seconds, T is in the order of about 1 to 9 seconds (depending on triangle geometry), and the width of each of the main beam blip and the bistatic echo blip is normally in the order of approximately 30 milliseconds. The determination of the centroid of such a blip can normally be expected to be in the order of about 1 millisecond or less. With these typical numbers the angle $\phi$ can be expected to be determined to within 1/1000 of 360°, or 0.36° or better.

The angle $\theta$ as determined above by the subtraction of two angle measurements is of similar accuracy. A modern 4 element phase interferometer DFE is capable of accuracies in the order of 0.5 to 2.0 degrees dependent on angle off array boresight. When 2 angles are measured at the same frequency, the systematic bias errors cancel resulting in a slightly better accuracy for the angle $\theta$. In addition, each pulse of a blip results in a unipulse angle measurement. If there are N pulses in a blip the accuracy of angle $\theta$ can be improved by averaging N measurements. The improvement is the square root of N.

While the main beam of the radar 30 is illuminating the passive target 32 via $R_1$, a side lobe signal of the radar is reaching the aircraft 28 via $R_3$. The time difference, t, is the extra time, in microseconds, that the bistatic signal, i.e., the radar main beam via $R_1$ plus the echo via $R_2$, takes to traverse the path $R_1+R_2$ over and above the time the radar side lobe signal takes to traverse the path $R_3$. This direct path side lobe signal via $R_3$ is the first signal to reach the aircraft 28 while the radar main beam is illuminating the passive target 32 via $R_2$. This side lobe signal is followed closely at aircraft 28 by some direct multipath signals which are ignored. However, this side lobe signal is also followed at aircraft 28 by bistatic echos which are processed by the DFE as passive targets. Time difference t is typically much smaller than time difference T, and therefore, t requires a very precise measuring means, such as a crystal clock timer or range gates or any known means for precise measurement of time. The normal range of t is about 3 to 200 microseconds. Time t is measured from the leading edge of the direct path side lobe signal which traverses $R_3$ to the leading edge of the bistatic echo which traverses $R_1+R_2$. Measurement accuracy can easily be less than 1 microsecond. 100 nanoseconds is not unreasonable. Each pulse in a blip of N pulses is measured independently. If all pulses are averaged, the accuracy of the average will be improved by the factor of the square root of N.

Angle $\phi$ has been measured by means of calculations using the radar scan period and the measurement of time difference T. The angle $\theta$ has been measured by the DFE at the aircraft 28. $(R_1+R_2-R_3)$ has been determined by the measurement of time t. This is enough information for any computer typically associated with DFE to solve the triangle $R_1$, $R_2$, $R_3$ and yield unambiguous range and angle to both the passive target 32 and to the active radar 30.

In any triangle the sum of the 3 angles = 180°. Knowing the angles $\theta$ and $\phi$, the angle $\alpha$ of FIG. 3 is also known.

By the law of sines $$R_1/\sin \phi = R_2/\sin \theta = R_3/\sin \alpha$$

Given $\phi$, $\theta$ $$\alpha = 180° - (\theta + \phi)$$

$$\sin \alpha = \sin[180° - (\theta + \phi)] = \sin(\theta + \phi)$$

therefore, $$\frac{R_1}{\sin \phi} = \frac{R_2}{\sin \theta} = \frac{R_3}{\sin(\theta + \phi)}$$

t is measured in microseconds $$Ct = (R_1 + R_2) - R_3$$

Where
  C = velocity of light
  t = time difference of arrival between direct signal and the bistatic echo Substituting $R_3 = R_1 + R_2 - Ct$ yields $$\frac{R_1}{\sin \phi} = \frac{R_2}{\sin \theta} = \frac{R_1 + R_2 - Ct}{\sin(\theta + \phi)}$$

Solving the two simultaneous equations above yields, $$R_1 = \frac{Ct}{1 + \frac{\sin \theta}{\sin \phi} - \frac{\sin(\theta + \phi)}{\sin \phi}}$$

$$R_2 = R_1 \frac{\sin \theta}{\sin \phi}$$

$$R_3 = R_1 \frac{\sin(\theta + \phi)}{\sin \phi}$$

The above three equations solve the range $R_1$ from the aircraft 28 to the passive target 32, and the range $R_3$ from the aircraft to the radar 30. The DFE yields the direction with respect to the centerline of the aircraft 28 to both the passive target 32 and to the radar 30.

As mentioned previously, the present invention may be used on any platform having direction finding equipment. The passive targets may be moving, such as aircraft, or stationary, or a combination of moving and stationary objects. Targets include vehicles, clutter-patch, debris cloud, chaff cloud, etc.

The invention may be used to locate a number of targets at least one of which is active. The DFE which utilizes the present invention is typically tunable. Thus, a number of targets may include a plurality of active targets. The invention will recognize the target that is operating in the same frequency range as the DFE as the active target and will recognize the remaining targets as passive targets. Of course the invention recognizes all non-active targets as passive. In order to recognize a second or subsequent active target, the DFE is tuned to a frequency at which the second or subsequent active target operates. This procedure may be used as often as desired to locate any number of active targets.

Obviously many more modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A method for passively determining the location in range and azimuth of a number of objects from a platform comprising:
  receiving a first electromagnetic energy signal from a first object, said first object emitting energy over a scan angle A during a scan period P, said first energy signal traversing a path $R_3$ from said first object to said platform, said energy signal arriving at the platform at time $T_1$ and at an angle of arrival $B_1$, said energy signal traversing path $R_3$ during a time $t_1$;

receiving an electromagnetic energy signal echo from a second object, said echo traversing a path $R_1$ from said second object to said platform, said echo arriving at said platform at time $T_2$ and at an angle of arrival $B_2$, said echo being a reflection of electromagnetic energy traversing a path $R_2$ from said first object to said second object, said energy traversing path $R_2$ and said echo traversing path $R_1$ during a combined time $t_2$;

determining an angle $\theta$ subtended by path $R_2$;

determining an angle $\phi$ subtended by path $R_1$;

determining a difference, t, in time said t being $t_2-t_1$; and utilizing said angles $\theta$ and $\phi$ and said difference t in time to determine a distance from said platform to said first object along path $R_3$, a distance from said platform to said second object along a path $R_1$, a distance from said first object to said second object along path $R_2$.

2. The method of claim 1 wherein the step of determining an angle $\theta$ subtended by path $R_2$ comprises calculating the difference between said angle of arrival $B_1$ of said first energy signal and said angle of arrival $B_2$ of said energy signal echo.

3. The method of claim 1 wherein the step of determining an angle $\phi$ subtended by path $R_1$ comprises solving for $\phi$ according to $$\phi = \frac{(T_2 - T_1)}{P} A.$$

4. The method of claim 1 wherein the step of utilizing said angles $\theta$ and $\phi$ and said difference t in time to determine distances along paths $R_3$, $R_1$ and $R_2$, comprises determining $$Ct = (R_1 + R_2) - R_3$$

where $C$ = velocity of light $t$ being microseconds $$\frac{R_1}{\sin \phi} = \frac{R_2}{\sin \theta} = \frac{R_3}{\sin(\theta + \phi)}$$

for yielding $$R_1 = \frac{Ct}{1 + \frac{\sin \theta}{\sin \phi} - \frac{\sin(\theta + \phi)}{\sin \phi}}$$

$$R_2 = R_1 \frac{\sin \theta}{\sin \phi}$$

$$R_3 = R_1 \frac{\sin(\theta + \phi)}{\sin \phi}.$$

* * * * *